Figure 1:
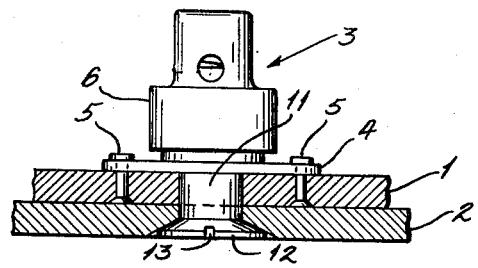

Sept. 25, 1956 C. F. MARSCHNER 2,763,908
CLOSURE FASTENER FOR AIRCRAFT
Filed July 30, 1952 2 Sheets-Sheet 1

INVENTOR:
CHARLES F. MARSCHNER
By Grandy, Sieder, Warkuff & Rees
ATTORNEYS.

Sept. 25, 1956　　　　C. F. MARSCHNER　　　　2,763,908
CLOSURE FASTENER FOR AIRCRAFT
Filed July 30, 1952.　　　　　　　　　　　　　　　2 Sheets-Sheet 2
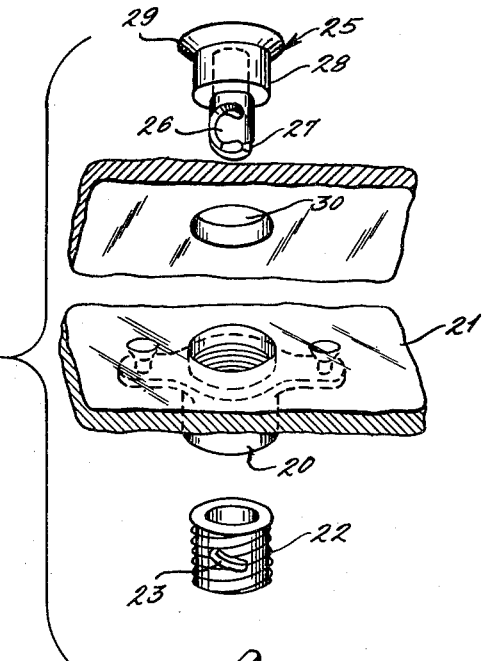
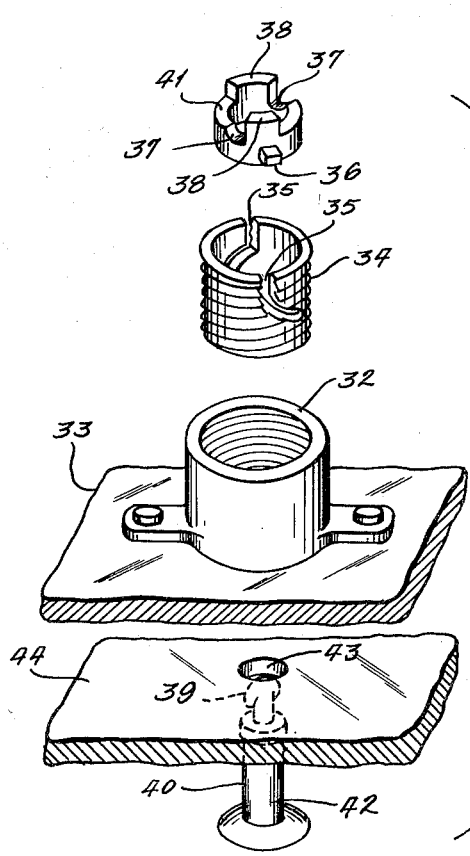
INVENTOR:
CHARLES F. MARSCHNER
By Grundy, Sieder, Wadruff & Rees
ATTORNEYS.

United States Patent Office 2,763,908
Patented Sept. 25, 1956

2,763,908

CLOSURE FASTENER FOR AIRCRAFT

Charles F. Marschner, Normandy, Mo., assignor to McDonnell Aircraft Corporation, St. Louis, Mo., a corporation of Maryland Application July 30, 1952, Serial No. 301,746

3 Claims. (Cl. 24—221)

This invention relates to closure fasteners and is more particularly directed to a quickly disconnectable and connectable fastener for aircraft compartment closures.

The primary object of the invention is to provide a fastener for a closure in which two parts are connected by a cam and pin connection whose direction of operation is opposite to screw and nut direction of operation of the fastener so that as the latter is actuated it will prepare the fastener for quick connection and disconnection.

Another object of the invention is to provide a quick connect and disconnect fastener that will not loosen when vibrated, is low in cost of manufacture and installation and requires no special tools to operate.

The invention consists in the provision of a fastener to be applied to closures for aircraft compartments which involves a cam whose direction of movement with regard to a follower is opposite to the screw and nut for preparing the parts of the fastener together more rapidly during connect and disconnect operations and for insuring the clamping action and efficiency of the fastening device.

This invention also consists in a fastener which will quickly joint two or more sheets and quickly disconnect the same, and, at the same time, provide high shear and tension strength, low joint deflection under load, and a wide range of take-up capacity.

Figure 3:
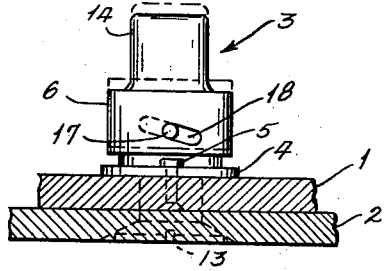
Figure 2:
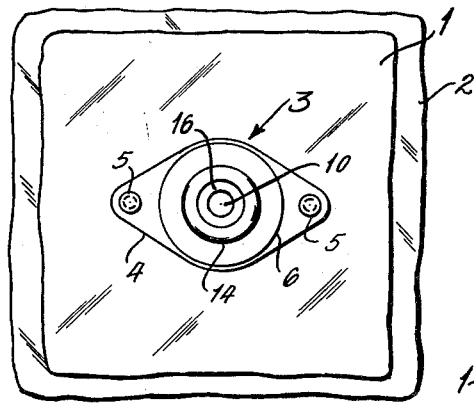
Figure 5:
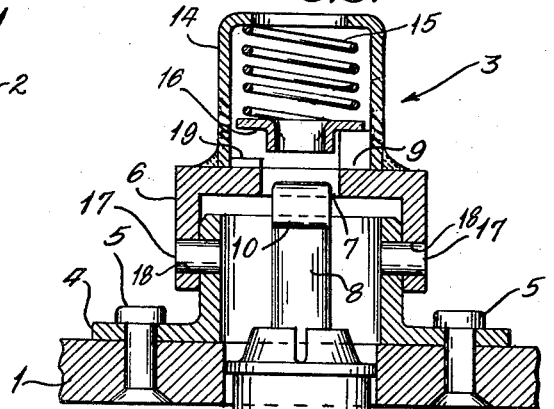
Figure 4:
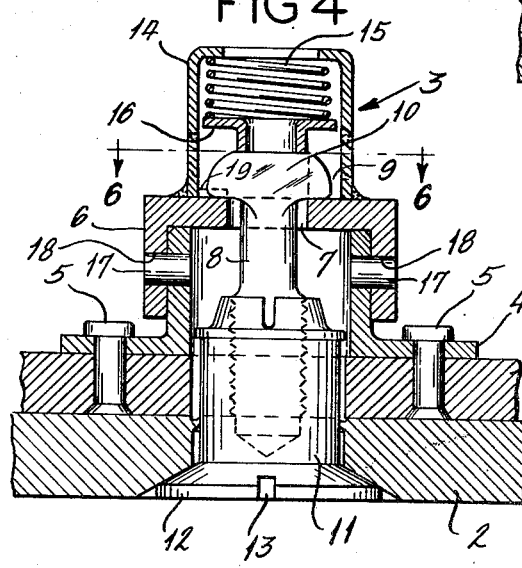
Figures 6, 7, 8:
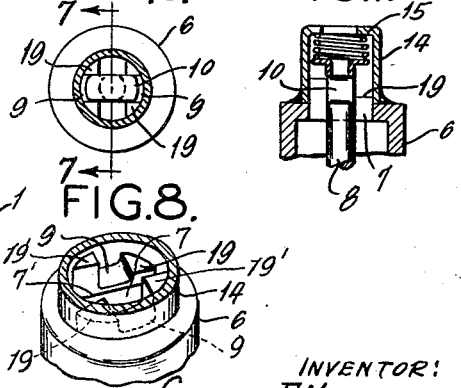

In the drawings:

Fig. 1 is an elevational view of the invention applied to two plates shown in section, Fig. 2 is a plan view thereof, Fig. 3 is a view similar to Fig. 1 but rotated 90° therefrom, Fig. 4 is a vertical sectional view of the fastener, Fig. 5 is a view similar to Fig. 4 but with the parts partially disassembled, Fig. 6 is a view taken substantially along the line 6—6 of Fig. 4, Fig. 7 is a view taken substantially along the line 7—7 of Fig. 6, Fig. 8 is a partial perspective view showing the construction of a part of the fastener, Fig. 9 is an exploded view of another form of the invention; and Fig. 10 is an exploded view of another embodiment of the invention.

The invention is embodied in the structure set forth in the several views of the drawing in which 1 designates the wall of a compartment located in an aircraft fuselage, for example, and 2 is the closure therefor. The closure is secured to the wall 1 by a suitable fastener 3 generally illustrated in Figs. 1, 2 and 3.

The fastener 3 consists of a receptacle 4 secured to the wall 1 by means of rivets 5 or other fastening means. A receptacle engaging or holding cup 6 is slidably fitted over the receptacle 4 and has an elongated slot type aperture 7 formed in the closed end thereof through which the laterally enlarged or winged head 10 of the tension member 8 is passed during the application of the fastener to the closure. The shape of the aperture 7 and head 10 is shown to best advantage in Figs. 6, 7 and 8. Located above the holding cup 6 is a suitable annular fitting having sockets 9 therein that receive the head 10 of the tension member 8. The fitting sockets are formed by cutting the same as an axially open notch bounded by a short abutment 19 and a high abutment 19' which is a stop. The fitting has a slotted aperture 7' to match the aperture 7, as seen in Figs. 6 and 8. The tension member 8 is threaded into a bushing 11 that extends through suitable apertures cut in wall 1 and closure 2. The bushing may be integral with the head 12 or may be a separate member as desired. The head is preferably flared or wing-shaped as illustrated and the bushing has a screw-driver slot 13 so that the bushing may be rotated relative to the tension member 8.

The cup 6 is provided with an extension 14 also cup shaped and may be integral with the portion 6 or secured thereto as desired. The annular fitting rests upon the end of the cup 6 surrounding the slot 7 and within the extension 14. The extension also encloses a spring 15 one end of which abuts the turned-in section of the cup extension 14 and the other end of the spring is in engagement with a flange spring follower member 16 that is loose in the extension, but which engages the head 10 of the tension member 8. The spring 15 assists in projecting the tension member from the receptacle when the head 10 is aligned with the apertures 7 formed in the cup 6.

For the purpose of facilitating the clamping, connecting and disconnecting of the compartment wall 1 and the closure 2 by the fastener, a pair of cam follower elements or pins 17 is fitted into the receptacle 4 on opposite sides thereof. These pins are received in and follow the pitch of the cam slots 18 formed in the wall of the cup 6. The pins and cams extend in opposite directions and are diametrically disposed. The lead or pitch of the cam slots 18 is opposite to the pitch of the threads in the bushing 11 and on the tension member 8 so that as these two are turned relative to each other for tightening, the action between the follower pins 17 and cams 18 will facilitate the operation of the fastener.

When the fastener is in the secured position (Figs. 3 and 4), the cup 6 is in its lowest position resting on top of the receptacle 4 and pins 17 are at the uphill ends of slots 18. When loosened, pins 17 are at the downhill end of slots 18 and the cup 6 is raised (Figs. 3 and 5) off the end of receptacle 4.

The assembly consisting of the tension member 8 and the bushing 11 is inserted in the apertures cut in the closure 2 and compartment wall 1. The head 10 engages the flanged member 16 and compresses the spring 15 so that the head may be brought to a height which will permit it to pass over the abutments 19 and rest in the sockets 9. When this initial assembly is complete the bushing and tension member may be rotated relative to each other to clamp the parts together, with the pins 17 which function as cam followers moving in the cams 18.

When secured, cup 6 is in its lowered position, as shown in Fig. 4, in relatively tight frictional contact with or against the end of the receptacle 4 and when released the cup is elevated or moved away from the wall 1 or axially of the receptacle as indicated in broken lines in Fig. 3. Thus, when fully separated the pins 17 are at the lowest end of the cam slots 18.

In describing the operation of the device, it is convenient to understand that the bushing threads are standard right hand threads (clockwise for threading up) and the cam slots 18 are left handed. Thus if the device is to be released, bushing 11 is turned through its screw driven slot in the head 12 in a counter-clockwise direction (as in removing a screw). Also a suitable means is provided to create a slight friction or drag between the tension member 8 and the bushing 11, such for example, as by the formation of slots across the inner end of the bushing 11, one only of which slots is shown in Figs. 4 and 5 at the constricted inner end of the bushing 11, and slightly inpressing and constricting the slotted end of the bushing to thereby very slightly narrow the threaded bore of the bushing. While this bushing 11 is being turned the relative motion between the threads in the bushing and on the tension member will cause slight upward axial movement of tension member 8. The reference to "upward" or "downward" is applied merely for consistency with the views of the drawing and is not intended to limit the device. This slight upward axial movement of tension member 8, by no longer clamping down on and holding the cup 6 in frictional contact with the end of the receptacle 4, permits the cup 6 to begin rotating under the turning action of the head 10 pressing against the abutments 19, the rotation of the cup being in the same direction as that of the bushing 11. As cup 6 rotates, the cam slot 18 in cup 6 will ride on the pin 17 in such a manner that cup 6 will rise thereby tending to tighten the fastener at the same time as the screw threads are tending to loosen the fastener.

The slight frictional drag between the threaded part of the tension member 8 and the threads of the bushing is just sufficient to overcome any frictional drag occurring between the pin 17 and the cam slot 18, after the cup is freed.

The above described action of the tension member and cup will continue until the pins 17 have reached the end of the slot 18 at which time the cam-produced tightening action will stop and the screw thread loosening action will produce enough looseness in the fastener, or in other words, the tension member 8 will have moved axially to a sufficient extent, that the head 10 of the tension member can ride over the abutments 19, permitting the head 10 to pass through the aperture 7 and thereby permitting the fastener to separate.

Briefly, then, as will be seen from the foregoing description the action of the left-hand cam, right-hand thread device is to cause slight over-loosening of the fastener in order to insure trouble free re-engagement at a later time, without having to further loosen the fastener even though, in the meantime, a small quantity of dirt or other extraneous matter may have gotten between the plates being joined. Other than the possibility of dirt having gottend between the plates, there is also the possibility that the plates being joined might be warped and adjacent fasteners might not be already pulled down. The over-loosening of the fasteners will then eliminate the need for further loosening under these conditions.

A modified form of the invention is illustrated in Fig. 9 in which a receptacle 20 is secured to the wall 21 of a compartment or opening in the fuselage or structure of an aircraft. This receptacle is internally threaded and receives a hollow nut 22 provided with cam slots 23 formed on opposite sides of the nut. A pin 24 is received in the slots 23 and cooperates with a tension member 25 provided with a head 26 having cam slots 27 formed therein. This tension member may be provided with a bushing 28 that is to be in engagement with the flared head 29 of the tension member and is to fit in aperture 30 and corresponding aperture in wall 21. The tension member passes through these apertures and enters the nut 22 and then the cam slots therein engage the pin 24. Relative rotation of nut and tension member will cause the closure 31 to be clamped to the wall 21. The action of the pin 24 in the cam slots 22 is the same as that described above.

Another modification of the invention is disclosed in Fig. 10 in which an internally threaded receptacle 32 is suitably secured to the wall 33 of a compartment or other opening in the aircraft fuselage. An externally threaded nut 34 equipped with diametrically disposed slots 35 forming a cam is threaded into the receptacle 32. A special form of cam follower having diametrically disposed projections or pins 36 (only one shown) is received in the slots 35. The end of the follower 37 has axial extensions 38 thereon that are engaged by wings 39 of the tension member 40. The tension member is extended through the opening in the nut 34 and is then lifted on the surfaces 41 for engagement with the axial extensions 38 thus preventing relative rotation between the nut and the tension member 40. The tension member 40 has a suitable bushing 42 thereon that is received in an aperture 43 cut in the closure 44 that is to be clamped to the wall 33. The tension member and its associated bushing are passed through an opening 43 in closure 44 and the head 39 then admitted into the follower 37 and then is lifted onto the surfaces 41 so as to prevent the relative rotation whereupon the tension member is rotated for the purpose of rotating the nut in the receptacle 32 for reasons set forth above.

The cam action which forms part of each of the above fasteners after the parts have been assembled are rotated in the necessary direction causing the tension members to act on the pins or followers upon the relative rotation of the tension member and the nut in each of the devices so that the followers move parallel and toward the surface of the closure and the chamber wall. This motion permits the cam slots to positively act within the cams. Further relative rotation causes the cam followers to move in their slots until they reach the ends thereof thus further tightening the fastener end and lessening the chances for the closure in the chamber wall to slip. Regardless of the form that the slot and pins take the resulting action is identical.

It is preferred in each of the forms of the invention where the head and tension member engages the nut or the fitting that receives the head that this fitting incorporate suitable fiber for the purpose of increasing the drag between the part and the receptacle so that the action of the fastener will be positive and prevent slippage.

What is claimed is:

1. A fastener comprising a receptacle to be secured to one of two separable parts, a cup telescopically fitted to the receptacle, a shear bushing adapted for insertion through an opening in the other of said separable parts and in axial relation with the receptacle, an elongate tension member having a head adjacent one end, means threadably connecting the other end of the tension member in the bushing for axial extension therefrom into the receptacle, said cup having a side wall cam slot, a cam follower carried by the receptacle and engaged in said slot, the cam slot having a pitch opposite to the pitch of the thread means connecting the tension member with the bushing, and detachable coupling means carried by the cup and the tension member effecting the coupling of the head with the cup when the tension member is axially moved in one direction and to uncouple the head therefrom when the tension member is axially reversely moved.

2. The invention according to claim 1 wherein the head embodies two laterally projecting portions and the last stated means comprises notches formed at opposite sides of the cup in which said projecting portions are adapted to engage.

3. A fastener for releasably securing together first and second separable members having aligned openings, said fastener comprising an open-ended receptacle secured to the first member in alignment with the opening therein, a cup telescopically fitted to the receptacle and having an end wall overlying the end of the receptacle remote from the first member, said end wall having a slot therethrough, a bushing rotatably supported in the opening of the second member in position for extension into said receptacle through the opening of the first member, an elongate tension member having threaded connection at one end in the bushing and directed axially therefrom for extension through the receptacle, a head carried by the tension member adapted to pass through said slot, means carried by said end wall on the side thereof remote from the receptacle for effecting non-rotatable engagement with said head when the latter is turned on the axis of the tension member to one position with respect to and following its extension through the slot, a camming coupling between the walls of the receptacle and cup adapted when rotated relative to the receptacle to axially shift the cup, the threads connecting the tension member and the bushing being pitched oppositely to the camming coupling, and means for facilitating rotation of the bushing.

References Cited in the file of this patent

UNITED STATES PATENTS

| | | |
|---|---|---|
| 2,323,260 | Venditty | June 29, 1943 |
| 2,374,679 | Hallock | May 1, 1945 |
| 2,385,180 | Allen | Sept. 18, 1945 |
| 2,390,173 | Richey | Dec. 4, 1945 |
| 2,504,087 | Poupitch | Apr. 11, 1950 |
| 2,527,408 | Dzus | Oct. 24, 1950 |